(12) United States Patent
Fischer

(10) Patent No.: US 7,774,793 B2
(45) Date of Patent: Aug. 10, 2010

(54) SYSTEM AND METHOD FOR THE INTEGRATION OF DATA OUTPUT BY A PLURALITY OF APPLICATIONS

(75) Inventor: Ilja Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 1455 days.

(21) Appl. No.: 11/155,447

(22) Filed: Jun. 16, 2005

(65) Prior Publication Data

US 2006/0287992 A1 Dec. 21, 2006

(51) Int. Cl.
G06F 3/00 (2006.01)
G06F 9/44 (2006.01)
G06F 13/00 (2006.01)

(52) U.S. Cl. ...................... 719/319; 709/245
(58) Field of Classification Search ......... 719/313–320; 717/136; 707/100, 1, 10, 200; 709/228, 709/245–246

See application file for complete search history.

(56) References Cited

U.S. PATENT DOCUMENTS

| 7,191,431 B2 * | 3/2007 | Brown et al. ................. 717/136 |
| 7,373,349 B2 * | 5/2008 | O'Brien et al. ............. 707/100 |
| 7,433,956 B2 * | 10/2008 | Zhao et al. ................... 709/228 |
| 2004/0017904 A1 * | 1/2004 | Williams et al. ........ 379/114.15 |
| 2004/0054808 A1 * | 3/2004 | Ekberg ........................ 709/245 |
| 2004/0123275 A1 * | 6/2004 | Brown et al. ................. 717/136 |
| 2004/0205782 A1 * | 10/2004 | Alcazar et al. ............. 719/328 |
| 2005/0033820 A1 * | 2/2005 | Steindl ........................ 709/213 |

* cited by examiner

*Primary Examiner*—Diem K Cao
(74) *Attorney, Agent, or Firm*—Kenyon & Kenyon LLP

(57) ABSTRACT

In a system and method for linking between data output by a plurality of applications, in response to a first data request addressed to a first application, the first request generated upon selection of a link in a page generated by a second application and displayed at a terminal, the first request including a first parameter, a processor may select a second parameter that is readable by the first application and that is equivalent to the first parameter, may transmit to the first application a second request for the data, the second request including the second parameter, and may transmit the data to the terminal after the data is output by the first application.

27 Claims, 3 Drawing Sheets

SYSTEM AND METHOD FOR THE INTEGRATION OF DATA OUTPUT BY A PLURALITY OF APPLICATIONS

BACKGROUND

Computer applications provide information to a user. The type of information one application provides often differs from the type of information a second application provides. However, the information provided by one of the applications often relates to the information provided by the other application. For example, regarding a single transaction, one application returns transactional data, such as the name of a seller, while a second application returns analytical data, such as reports and graphs, pertaining to the transaction.

Applications often provide information to a user via a web page. Many applications dynamically generate a collection of data and an arrangement of the data to be presented in the returned web page. The dynamic generation of the collection of data and the arrangement thereof is often performed in accordance with particular parameters input to the applications with or as the request for data. It is often desirable to provide in the returned page of one of the applications a link to another application that is to provide data related to the data of the returned page. The related data is to be provided in response to a data request that includes the parameters according to which the returned page was generated. To request the related page, it is necessary to pass to the second application the parameters by which the page of the first application was generated. However, the types of parameters recognized by each of a number of applications often varies. If when the user links to the second application from the page returned by the first application, the second application does not recognize the parameters passed to it, then the second application cannot return the requested data.

An example of applications that accept different kinds of parameters is where applications return data in accordance with parameters that are based on objects of SAP's Object Based Navigation (OBN). OBN provides for the instantiation of business objects. For a particular OBN, an application is configured to alternatively provide various types of information and representations of information depending on a user role. For example, with respect to the same transaction, a sales representative and a sales manager may require different types of information. Therefore, in response to a user request, if the user is a sales representative, the application will provide the user with one type of information. In response to the same request, if the user is a sales manager, the application will provide the user with a different type of information. The applications receive requests with parameters including an identifier of an object type and an OBN instance. The particular object that is instantiated can depend on the user role. Similarly, where two applications provide different types of information, as discussed above, the two applications may instantiate different OBN objects and may utilize different parameter types and parameter languages. Another example of applications that accept different kinds of parameters is where one application is an OBN based application and a second application is a non-OBN based application. Accordingly, the second application cannot provide data where the parameters passed to the second application are identifications of an OBN object type and an OBN object instance.

If a user selects a link from a page returned by the first application to a page to be dynamically generated by the second application, the OBN business object based parameters of the first application are passed to the second application. However, it may occur that the second application cannot read the parameters passed to it. In this instance, the second application is unable to generate the requested page including information related to the data provided in the page returned by the first application.

Accordingly, there is a need for system and method for enabling the linking from a page of one application to a page of a second application, where the two applications do not accept the same parameters for determining the data to be returned, and a page request transmitted during the linking includes parameters according to which the page of the first application was generated.

DETAILED DESCRIPTION

Figure 1:
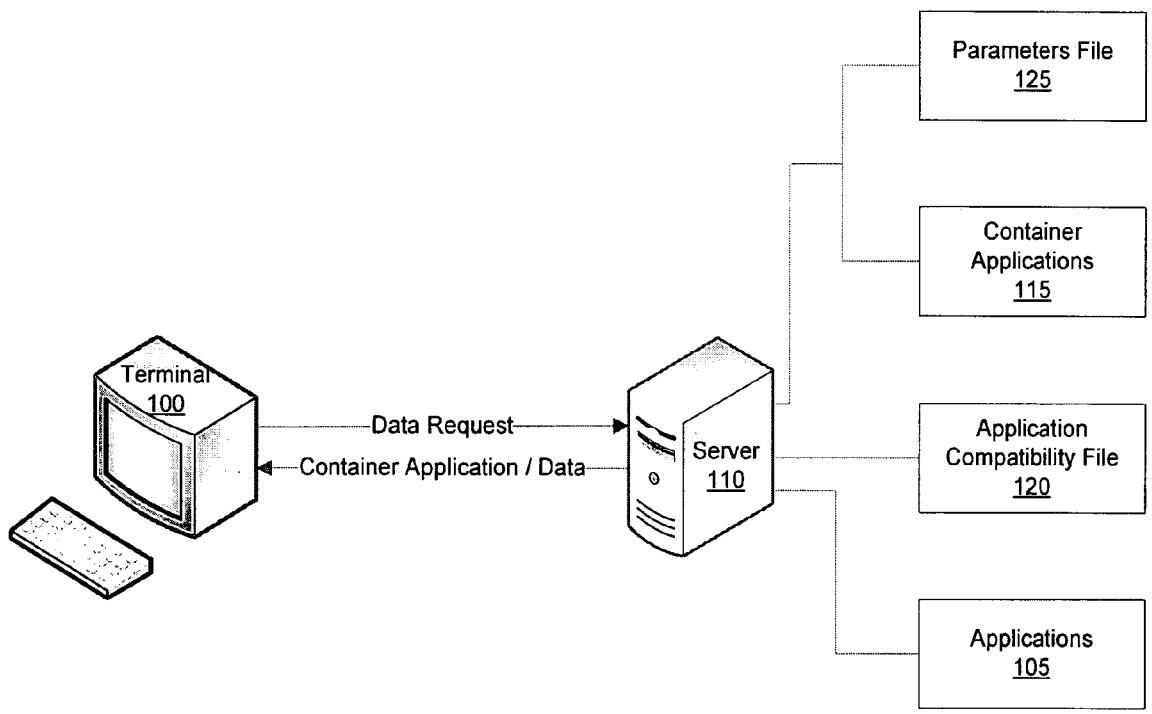
FIG. 1 is a block diagram that illustrates components of an example system, according to an example embodiment of the present invention.

Applications may output data in accordance with different parameter types and/or parameter languages. One application may therefore be unable to output data in accordance with parameters used by another application. Embodiments of the present invention relate to a computer system and method that may provide the integration of, and enable links between, such otherwise incompatible applications.

In particular, the kinds of data an application may provide may depend on a session context. For example, if a user opens a session as a purchaser, a first kind of data may be returned, but if the user opens the session as a seller, a second kind of data may be returned. For each session, one or more OBN objects may be instantiated. The particular objects that are instantiated may form the session context. For example, if the user opens a session as a purchaser, a first object may be instantiated, but if the user opens the session as a seller, a second object may be instantiated instead. Especially where the applications provide related data, e.g., data related to the same transaction or similar transactions, it may be desirable to switch from a session of a first application to a session of a second application to obtain the related data. To obtain related data, it may be required to open the session in the second application such that the session context of the second application session matches the session context of the first application session by indicating to the second application the session context of the first application session. However, especially where legacy applications are originally configured to be operated separately such that a user would separately open and maintain a session of each, the applications may refer to parameters of a session context in different ways. For example, each of the applications may refer to the same OBN object instance in a different way. It may also occur that the applications instantiate similar, but not necessarily the same, OBN objects. Therefore, indicating to the second application the OBN objects instantiated by the first application may not provide the second application with the session context parameters necessary for opening a second application session with the correct session context.

Embodiments of the present invention may provide for the update of such legacy applications to allow for the linking between sessions of the applications and the data outputs of such sessions, without necessitating changes in the types of parameters used by the legacy applications. Links may be provided in the output of a first application for linking to output of a second application. Upon selection of a link, a data request may be transmitted towards the second application. The data request may include parameters indicating a session context in which the second application is to provide the data. A container application may intercept the transmitted request, find parameters that are readable by the second application and that are equivalent to or most similar to the parameters included in the request, and transmit to the second application a new data request that includes the new parameters. In response to the request received by the second application, a session may be opened in the second application. The session context of the opened session may be the same or similar to that of the session of the first application in which the data request was transmitted. The second application may output data and transmit it to the container application. The container application may provide the data to the user.

In an embodiment of the present invention, the computer system and method may provide for the interception of a data request sent to the second application upon selection of the link, and the substitution of a parameter(s) included in the data request and unreadable by the second application with a different parameter(s) that is readable by the second application. Other than that the second application may read the second parameters, the first and second parameters may be essentially equivalent.

FIG. 1 is a diagram that illustrates components of an example system according to an example embodiment of the present invention. A processor at a terminal 100 may transmit a request for data to a first application 105. The first application 105, or a portion thereof, may be loaded at the terminal 100 for execution thereon. Alternatively, the first application 105 may be executed at an external location. For example, the request may be transmitted over a network to the first application 105 via a server 110. One skilled in the art will recognize that the applications 105 may be locally stored at the server or at an external location, but discussion regarding the exact location of the applications 105 is not important for an understanding of the present invention. The server 110 may forward the data request to the first application 105. The data request may include a first parameter. The first parameter may be, for example, an identification of an instantiated OBN object or another OBN based parameter. In response to the data request, the first application 105 may output data in accordance with the first parameter, e.g., for display at the terminal 100.

The data may be displayed in a first page, e.g., of a web browser. The first page may include links for retrieving data to be output by a second application 105. The first and second applications 105 may belong to the same application environment. For example, they may both have access to the same database(s), may be configured to perform different functions upon data of the database(s), and may be configured to provide different types of information regarding data stored in the database(s). For example, the first application 105 may be configured to provide details of each of a plurality of business transactions, e.g., including seller name, buyer name, item, quantity, price, etc. The second application 105 may be configured to provide analytical graphs describing trends, market share, etc. concerning the same transactions.

Upon selection of the link, a request for the data may be transmitted to the second application 105 via the server 110. To inform the second application 105 of the particular data to output, i.e., data related to that which is displayed in the first page, the request may include the first parameter. It may occur that the second application 105 is not configured to read the first parameter. For example, the second application 105 may use parameter types or a parameter language different than that used by the first application 105. In response to the request, the server 110 may implement a container application 115. The container application 115 may determine a second parameter readable by the second application 105 that is equivalent to, or most similar to, the first parameter. The container application 115 may transmit a second request that includes the second parameter to the second application 105. In response to the second request, the second application 105 may output the requested data for display at the terminal 100.

Two or more applications 105 may use the same parameter language and the same parameter types, while other applications 105 may use different parameter languages and/or parameter types. In an embodiment of the present invention, when the server 110 receives the first request, the server 110 may determine whether the first and second applications, i.e., the application that had output the data arranged in the first page and the application to which the data request is to be transmitted, use the same parameter languages and parameter types. For example, to make the determination, the server may access an application compatibility file 120, e.g., a look-up table, that may list the applications 105 and indicate which of the applications 105 use the same parameter language and parameter types. If the server 110 determines that the first and second applications use the same parameter languages and parameter types, the server 110 may forward the first request including the first parameter directly to the second application. In response to the first request, the second application 105 may output the requested data for arrangement in a second page to be displayed at the terminal 100. If the server 110 does not determine that the first and second applications are compatible, the server 110 may implement the container application 115 and may transmit the first request to the container application.

In an embodiment of the present invention, a plurality of container applications 115 may be provided. For example, a container application 115 may be provided for each incompatible application pair or for each of a number of groups of incompatible applications. For example, each application 105 of a group may use the same parameter language and parameter types. The application compatibility file 120 or another file may indicate the particular container application 115 to be implemented for integration of the first and second applications 105.

Even if the first and second applications 105 use different parameter languages or parameter types, they may use some of the same parameters. If the first request includes a parameter that is readable by the second application, substituting the first parameter with the second parameter may be omitted. For example, if the first request does not include any other parameters, the second application 105 may provide the requested data in response to the first request. In an embodiment of the present invention, the implemented container application 115 may determine whether the second application 105 can read the parameter(s) of the first request. For example, each container application 115 may have access to a corresponding parameters file 125. The parameters file 125 may include a list of parameters readable by both the first and second applications 105. If the container application 115 determines that the second application 105 can read the parameter of the first request, the container application 105 may forward the first request including the first parameter to the second application 105. In response to the first request, the second application 105 may output the requested data for arrangement in a second page to be displayed at the terminal 100. If the container application 115 does not determine that the second application 105 can read the parameter of the first request, the container application 115 may replace the first parameter with the second parameter, and may transmit to the second application 105 a second request including the second parameter.

In one example embodiment of the present invention, the container application 115 may transmit an identification of each of the first and second applications 105 and the parameter of the first request to a backend application, e.g., via the server 110. Alternatively, where a number of applications use the same parameter language and types, the container application 115 may transmit to the backend application an identification of a group of applications to which the first application belongs and a group of applications to which the second application belongs. The backend application may parse the passed parameter and may return to the container application 115 a string that includes a new parameter equivalent to, or most similar to, the passed parameter and that is readable by the second application 105. The container application 115 may generate the second data request and may insert into the request the string returned to the container application 115 by the backend application. The container application 115 may transmit the second request including the string to the second application 105.

In an embodiment of the present invention, the server 110 may transmit to the terminal 100 the container application 115 for execution at the terminal 100. The container application 115 may provide a user interface. For example, the container application 115 may generate a page for display at the terminal 100. Data objects of the container application 115 may be arranged in the page. The data objects of the container application 115 may be a blank frame in which data output by the second application may be arranged. For example, each application 105 and each container application 115 may provide a frame that includes its content for display at the terminal 100. Content of the container application 115 may include functions for providing the integration of the first and second applications 105, and may omit displayable content. Accordingly, the container application 115 may provide a blank frame for arrangement in the page displayed at the terminal 100. The container application 115 may control the passing of data requests between the first and second applications 105. Accordingly, in response to the request transmitted by the container application 115 to the second application 105, the second application 105 may output the requested data and transmit a frame including the requested data to the container application 115. The container application 115 may, in turn, provide the frame in its own dummy frame.

In one embodiment of the present invention, the server 110 may transmit the entire container application 115 to the terminal 100 for execution thereon. Alternatively, at least some portions of the container application may be executed at the server 110 or some other external location, and the server 110 may transmit to the terminal 100 other portions of the container application, for example, those portions that provide a user interface of the container application, including the frame.

Figure 2:
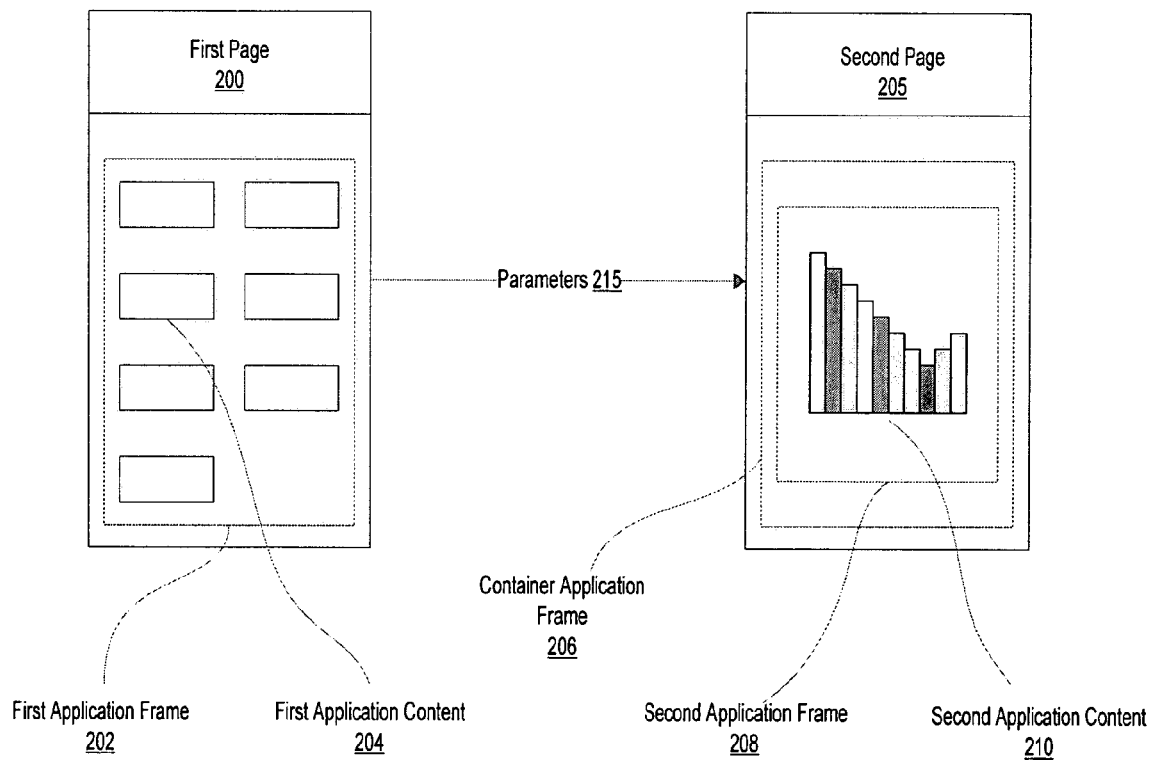
FIG. 2 illustrates example pages generated by applications of a system, according to an example embodiment of the present invention.

FIG. 2 illustrates example display pages, according to an example embodiment of the present invention. A first application may output content 204 arranged in a frame 202 for display in a first page 200 at a terminal. The content may include links that address a second application. A container application may be implemented for fielding a data request transmitted upon selection of the link. The container application may provide a frame 206 for display in a second page 205 at the terminal. The container application frame 206 may include content embedded therein. The content may include functions that may be executed by the container application. The container application frame 206 may be a dummy frame that does not provide viewable content of the container application. The data request may include parameters 215 according to which the second application is to output data. The functions embedded in the container application frame 206 may receive as input the parameters 215 of the data request, and may output a new data request that includes different parameters. The container application may transmit the new data request to the second application. In response to the request received by the second application from the container application, the second application may provide a frame 208 that includes content 210, e.g., the data output by the second application in response to the request, to the container application. The container application may embed the second application frame 208 in the container application frame 206.

Figure 3:
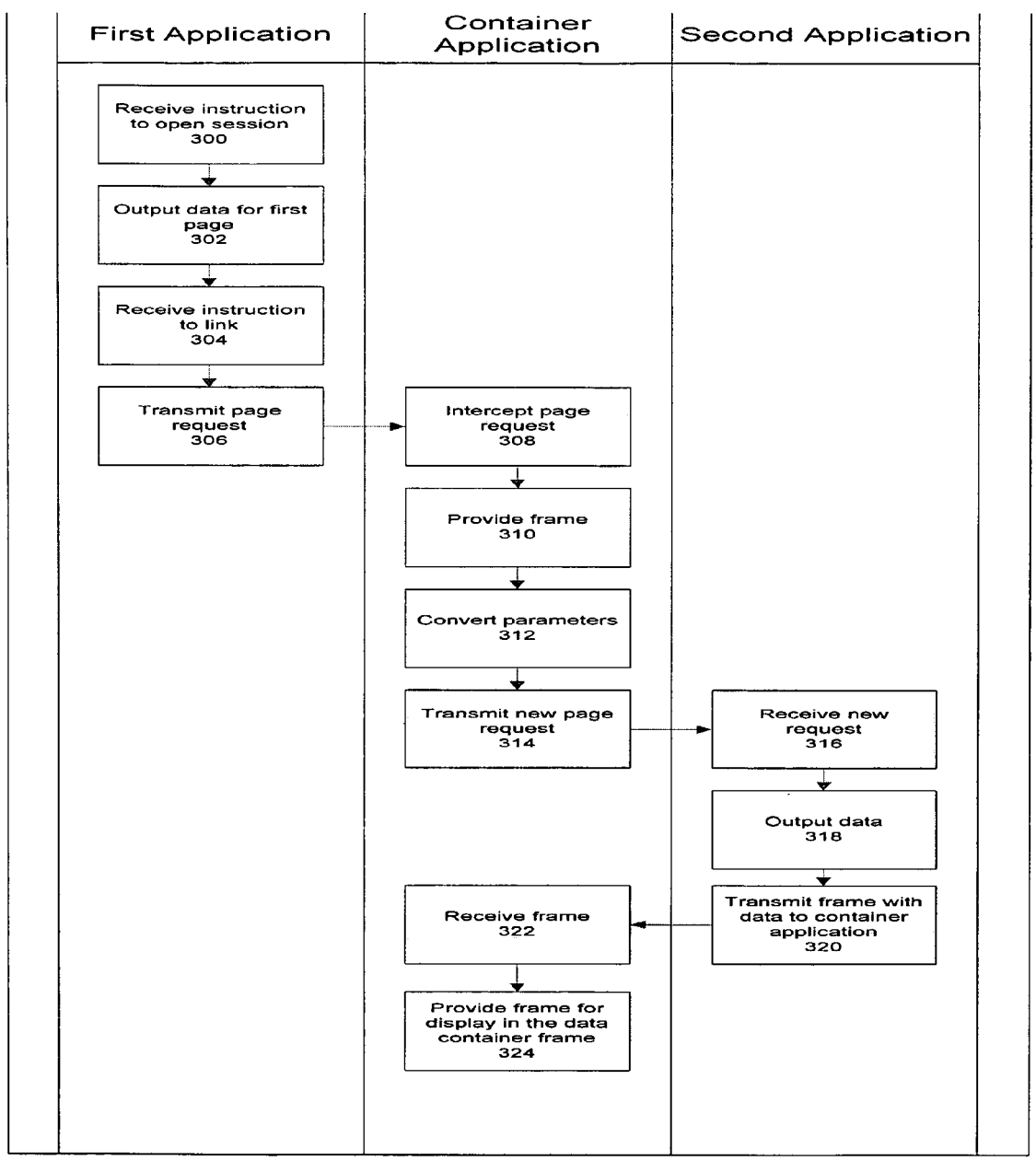
FIG. 3 is a flowchart that illustrates an example interaction between components of a system, according to an example embodiment of the present invention.

FIG. 3 illustrates an example interaction between components of a system, according to an example embodiment of the present invention. In 300, a first application may receive an instruction to open a session according to a particular session context. During the session, in 302, the first application may output data for display in a first page. The first page may include data and links to a second application. In 304, upon selection of a link in the first page, the first application (or a browser) may receive an instruction to link to a second page that provides data of the second application output in a session that has a session context the same as, or similar to, the session context in which the first page was generated. In 306, the first application (or the browser) may transmit a page request towards the second application. The page request may include parameters, e.g., that indicate a session context of a session in which the second application is to output data.

In 308, a container application may intercept the transmitted page request. For example, the first application may transmit the page request towards the second application via a server. Upon receipt of page request, the server may load the container application and may provide the container application with the page request. In 310, the container application may provide a frame for display. For example, the container application may transmit the frame to the browser to display in a web page. In 312, the container application may convert the parameters of the page request that are not readable by the second application, or that are not known to be readable by the second application, to new parameters that are readable by the second application. In 314, the container application may transmit a new page request that includes the new parameters to the second application.

In 316, the second application may receive the new request. In 318, the second application may output data according to the page request. In 320, the second application may transmit a frame including the output data to the container application.

In 322, the container application may receive the frame from the second application. In 324, the container application may provide the frame of the second application for display in the data container frame.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for retrieving data, comprising:
in response to a first data request (a) that is generated in response to selection of a link in a page provided by a first application, (b) that is addressed to a second application, and (c) that includes a first parameter according to which the second application is to provide data:
in a first determination performed by a server that receives the first request, determining whether the second application uses a parameter language that is used by the first application;
if, in the first determination, the server determines that the second application uses the parameter language, forwarding, by the server, the first request to the second application;
if, in the first determination, the server does not determine that the second application uses the parameter language:
transmitting by the server a container application to a requesting terminal from which the first request is received;
in a second determination, performed by the container application, determining whether the first parameter is readable by the second application;
if, in the second determination, it is determined that the first parameter is readable by the second application, forwarding, by the container application, the first request to the second application; and
upon a condition that, in the second determination, the determination that the first parameter is readable by the second application is not made:
converting, by the container application, the first parameter into a second parameter that is readable by the second application and that one of (a) is equivalent to, and (b) identifies a same session context as, the first parameter; and
transmitting to the second application a second request for the data, the second request including the second parameter instead of the first parameter.

2. The method of claim 1, further comprising:
selecting a particular one of a plurality of container applications for transmission to the requesting terminal, each of the plurality of container applications configured for the linking between different application pairs, the selected container application configured for the linking between the first and second applications.

3. The method of claim 1, wherein the first determination is performed in accordance with at least one of a first file and a first table that includes a list of applications and, for each listed application, at least one corresponding parameter language, and wherein the second determination is performed in accordance with at least one of a second file and a second table that includes a list of parameters and, for each listed parameter, at least one corresponding application or application type.

4. The method of claim 1, further comprising:
if during the second determination the container application does not determine that the first parameter is readable by the second application, transmitting the first parameter and an identification of the first and second applications by the container application to a backend application at the server; and in response
receiving by the container application from the backend application the second parameter.

5. The method of claim 1, further comprising:
outputting the data by the second application in response to one of the first and second requests; and
transmitting the data to the terminal.

6. The method of claim 5, further comprising:
if the server determines that the first and second applications use different parameter languages:
arranging in a display of the terminal a first display frame for the container application; and
arranging in the first display frame a second display frame for displaying the data output by the second application; and
otherwise:
arranging the second display frame directly in the display of the terminal without the first frame.

7. The method of claim 1, wherein the page is provided by the first application in response to a third data request that includes the first parameter.

8. A computer network comprising:
a terminal; and
a server configured to:
receive from the terminal a first data request that is (a) generated in response to a selection of a link in a page provided by a first application and (b) addressed to a second application, the first request including a first parameter according to which the second application is to provide data; and
in response to the first request, implement a container application configured to:
convert the first parameter into a second parameter that is readable by the second application and that one of (a) is equivalent to, and (b) identifies a same session context as, the first parameter; and
transmit to the second application a second request for the data, the second request including the second parameter instead of the first parameter;
wherein:
in a first determination, the server determines whether the second application uses a parameter language that is used by the first application;
the server forwards the first request to the second application if the server determines that the second application uses the parameter language, and otherwise implements the container application; and
in response to one of the first and second requests, the second application outputs the data; and
wherein:
if during the first determination, the determination that the second application uses the parameter language that is used by the first application is not made, a first display frame for the container application is arranged in a display of the terminal, and a second display frame for display of the data output by the second application is arranged in the first display frame; and
otherwise
the second display frame is arranged directly in the display of the terminal without the first frame.

9. The computer network of claim 8, wherein:
in a second determination, it is determined whether the first parameter is readable by the second application;
the first request is forwarded to the second application if it is determined in the second determination that the first parameter is readable by the second application; and
the second request is transmitted to the second application upon a condition that, during the second determination, the determination that the first parameter is readable by the second application is not made.

10. The computer network of claim 8, wherein the first parameter indicates a session context of a session in which the data is to be provided.

11. The computer network of claim 10, wherein the first parameter is an Object Based Navigation (OBN) parameter.

12. The computer network of claim 11, wherein the first parameter is an identification of an OBN object instance.

13. The computer network of claim 8, wherein:
the server is configured to select a particular one of a plurality of container applications for implementation in response to the first request;
each of the plurality of container applications is configured for linking between different application pairs; and
the selected container application is configured for linking between the first and second applications.

14. The computer network of claim 8, wherein:
in a second determination, the container application determines whether the first parameter is readable by the first application; and
the container application forwards the first request to the first application if the container application determines that the first parameter is readable by the first application, and otherwise transmits the second request to the first application.

15. The computer network of claim 14, further comprising:
a first file that includes a list of applications and, for each listed application, at least one corresponding parameter language, wherein the first determination is performed in accordance with the first file; and
a second file that includes a list of parameters and, for each listed parameter, at least one corresponding application or application type, wherein the second determination is performed in accordance with the second file.

16. The computer network of claim 14, further comprising:
a backend application at the server,
wherein:
if during the second determination the container application does not determine that the first parameter is readable by the first application, the container application transmits the first parameter and an identification of the first and second applications to the backend application; and in response
the backend application transmits the second parameter to the container application.

17. A computer network, comprising:
a terminal; and
a server configured to:
receive from the terminal a first data request addressed to a first application, the first request including a first parameter according to which the first application is to provide data; and
in response to the first request, implement a container application configured to:
convert the first parameter into a second parameter that is readable by the first application and that one of (a) is equivalent to, and (b) identifies a same session context as, the first parameter; and
transmit to the first application a second request for the data, the second request including the second parameter instead of the first parameter;
wherein:
the server transmits at least a portion of the container application to the terminal;
a first portion of the container application for displaying a display frame of the container application is transmitted to the terminal; and a second portion of the container application is implemented at the server for performing the conversion and for transmitting the second request to the first application.

18. The computer network of claim 17, wherein:
in a first determination, the server determines whether the first application uses a parameter language that is used by a second application, the first request generated in response to a selection of a link in a page generated by the second application; and
the server forwards the first request to the first application if the server determines that the first application uses the parameter language, and otherwise implements the container application.

19. The computer network of claim 17, wherein the first data request is generated in response to a selection of a link in a page provided by a second application in response to a third data request that includes the first parameter.

20. A method for retrieving data, comprising:
in response to a first data request that (a) includes a parameter for a first application and (b) is addressed to a second application:
in a first determination performed by a server that receives the first request, determining whether the second application uses a parameter language that is used by the first application;
if, in the first determination, the server determines that the second application uses the parameter language, forwarding, by the server, the first request to the second application; and
if, in the first determination, the server does not determine that the second application uses the parameter language:
in a second determination, performed by execution of a container application by a terminal from which the first request is received, determining whether the first parameter is readable by the second application;
if, in the second determination, it is determined that the first parameter is readable by the second application, forwarding, by the terminal, the first request to the second application; and
upon a condition that, in the second determination, the determination that the first parameter is readable by the second application is not made:
obtaining from memory a second parameter that is indicated in memory to be readable by the second application and to one of (a) be equivalent to, and (b) identify a same session context as, the first parameter;
generating a second request for the data, the second request including the second parameter instead of the first parameter; and
transmitting the second request to the to the second application.

21. The method of claim 20, wherein the first parameter indicates a session context of a session in which the data is to be provided.

22. The method of claim 21, wherein the first parameter is an Object Based Navigation (OBN) parameter.

23. The method of claim 22, wherein the first parameter is an identification of an OBN object instance.

24. The method of claim 20, wherein:
the first data request is generated in response to a selection of a link in a page provided by the first application; and the second application provides data according to whichever of the first and second parameters the second application receives.

25. A computer-readable medium having stored thereon instructions adapted to be executed by a processor, the instructions which, when executed, cause the processor to perform the method of claim 20.

26. The method of claim 20, further comprising:
transmitting, by the server, at least a portion of the container application to the terminal.

27. The method of claim 20, wherein the first parameter identifies a user role, the data being provided in different formats for different user roles.

* * * * *